(12) United States Patent
Besson (10) Patent No.: US 9,774,661 B1
(45) Date of Patent: Sep. 26, 2017

(54) SYSTEM, METHOD, AND COMPUTER PROGRAM FOR PROCESSING INTERDEPENDENT TRANSACTIONS BETWEEN A REQUESTING SYSTEM AND A TARGET SYSTEM

(71) Applicant: Amdocs Software Systems Limited, Dublin (IE)

(72) Inventor: Michel Besson, Roquefort les pins (FR)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 222 days.

(21) Appl. No.: 14/244,826

(22) Filed: Apr. 3, 2014

Related U.S. Application Data (60) Provisional application No. 61/807,801, filed on Apr. 3, 2013.

(51) Int. Cl.
    *H04L 29/08*     (2006.01)

(52) U.S. Cl.
    CPC .................. *H04L 67/10* (2013.01)

(58) Field of Classification Search
    None
    See application file for complete search history.

(56) References Cited

U.S. PATENT DOCUMENTS

| 2003/0105723 | A1* | 6/2003 | Skea | G06Q 20/04 705/64 |
|---|---|---|---|---|
| 2006/0168098 | A1* | 7/2006 | Allard | H04L 63/10 709/217 |
| 2006/0171405 | A1* | 8/2006 | Brendle | G06F 9/466 370/412 |
| 2006/0294006 | A1* | 12/2006 | Tsang | G06Q 30/06 705/39 |
| 2014/0114826 | A1* | 4/2014 | Lopez | G06Q 30/04 705/34 |

FOREIGN PATENT DOCUMENTS

WO      WO 99/23558    *   5/1999

\* cited by examiner

*Primary Examiner* — Kevin Bates
*Assistant Examiner* — Lesa Kennedy
(74) *Attorney, Agent, or Firm* — Zilka-Kotab, PC (57) ABSTRACT

A system, method, and computer program product are provided for processing interdependent transactions between a requesting system and a target system. In use, a first request to process associated first data is received at a target system, the first request being received from a requesting system. Further, it is determined that processing of the first data by the target system is dependent on processing of second data associated with at least one second request. Responsive to determining that the processing of the first data by the target system is dependent on processing the second data by at least one second request, the first request and the associated first data are stored in the target system, in a temporary cache, a transaction is created by the target system, a notification is sent to the requesting system indicating that processing of the first data was not completed, and a transaction identifier associated with the transaction is sent to the requesting system.

6 Claims, 6 Drawing Sheets

SYSTEM, METHOD, AND COMPUTER PROGRAM FOR PROCESSING INTERDEPENDENT TRANSACTIONS BETWEEN A REQUESTING SYSTEM AND A TARGET SYSTEM

CLAIM OF PRIORITY

This application claims the benefit of U.S. Provisional Application No. 61/807,801, filed Apr. 3, 2013, the entire contents of which are incorporated herein by reference.

FIELD OF THE INVENTION

The present invention relates to communication between computer system architectures, and more particularly to optimizing request/response interactions between software applications associated with such computer system architectures.

BACKGROUND

Telecommunication service providers often use a large variety of software applications to manage their services and networks in their operating centers. These applications communicate through request/response dialogue mechanisms. For example, an application associated with a requesting system may send one or more requests to an application associated with a target system, which receives and executes requests.

A target system handling data typically modifies the data by executing requests submitted by one or more requesting systems. When it is not feasible to modify data consistently in a single request, a requesting system typically encapsulates several consecutive requests inside an explicit transaction terminated by a transaction commit.

In the absence of a transaction context, a request, in which execution thereof would result in the creation of inconsistent data, will typically be rejected by the target system. A failure response will be sent back to the requesting system, which will then have to open a transaction first before resending the original request to be executed again in the target system, this time in the context of the transaction opened by the requesting system. This is a time consuming process. There is thus a need for addressing these and/or other issues associated with the prior art.

SUMMARY

A system, method, and computer program product are provided for processing interdependent transactions between a requesting system and a target system. In use, a first request to process associated first data is received at a target system, the first request being received from a requesting system. Further, it is determined that processing of the first data by the target system is dependent on processing of second data associated with at least one second request. Responsive to determining that the processing of the first data by the target system is dependent on processing the second data, the first request and the associated first data are stored in the target system, in a temporary cache, a transaction is created by the target system, a notification is sent to the requesting system indicating that processing of the first data was not completed, and a transaction identifier associated with the transaction is sent to the requesting system.

DETAILED DESCRIPTION

Figure 1:
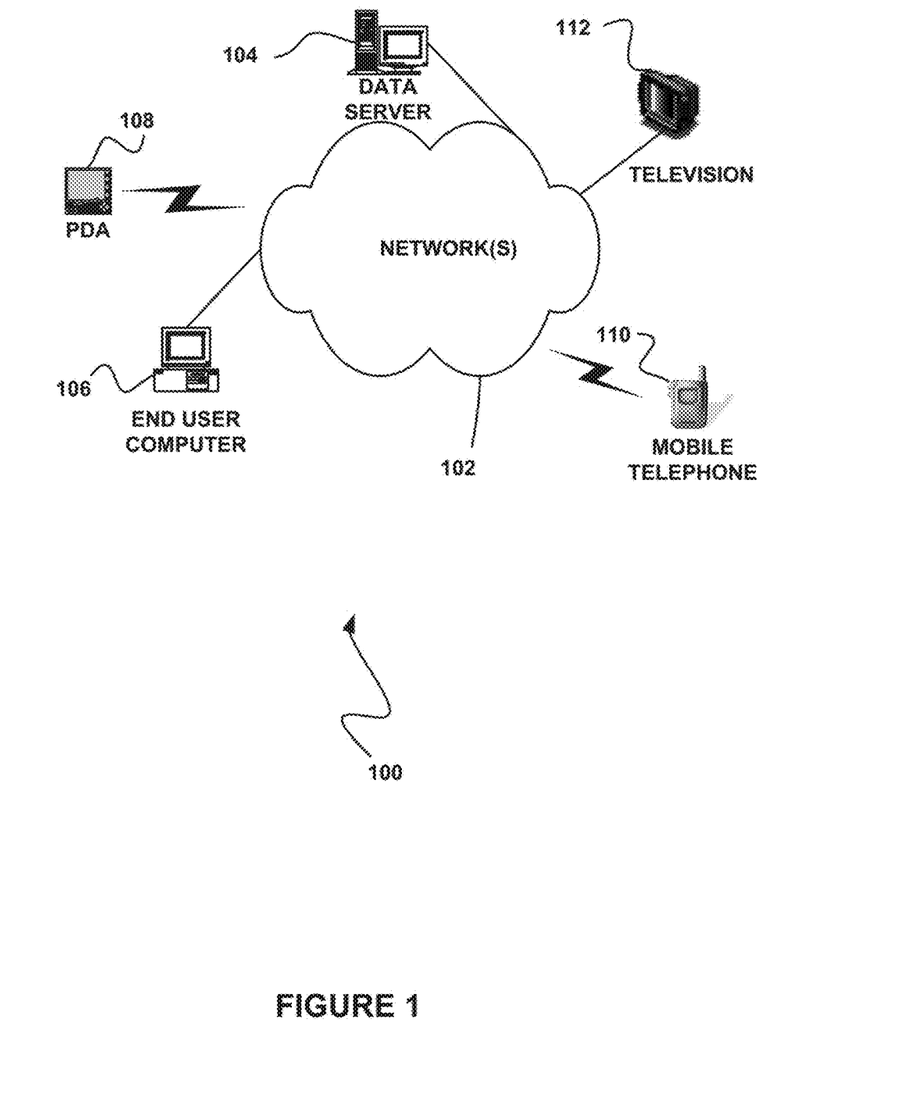
FIG. 1 illustrates a network architecture, in accordance with one possible embodiment.

FIG. 1 illustrates a network architecture 100, in accordance with one possible embodiment. As shown, at least one network. 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
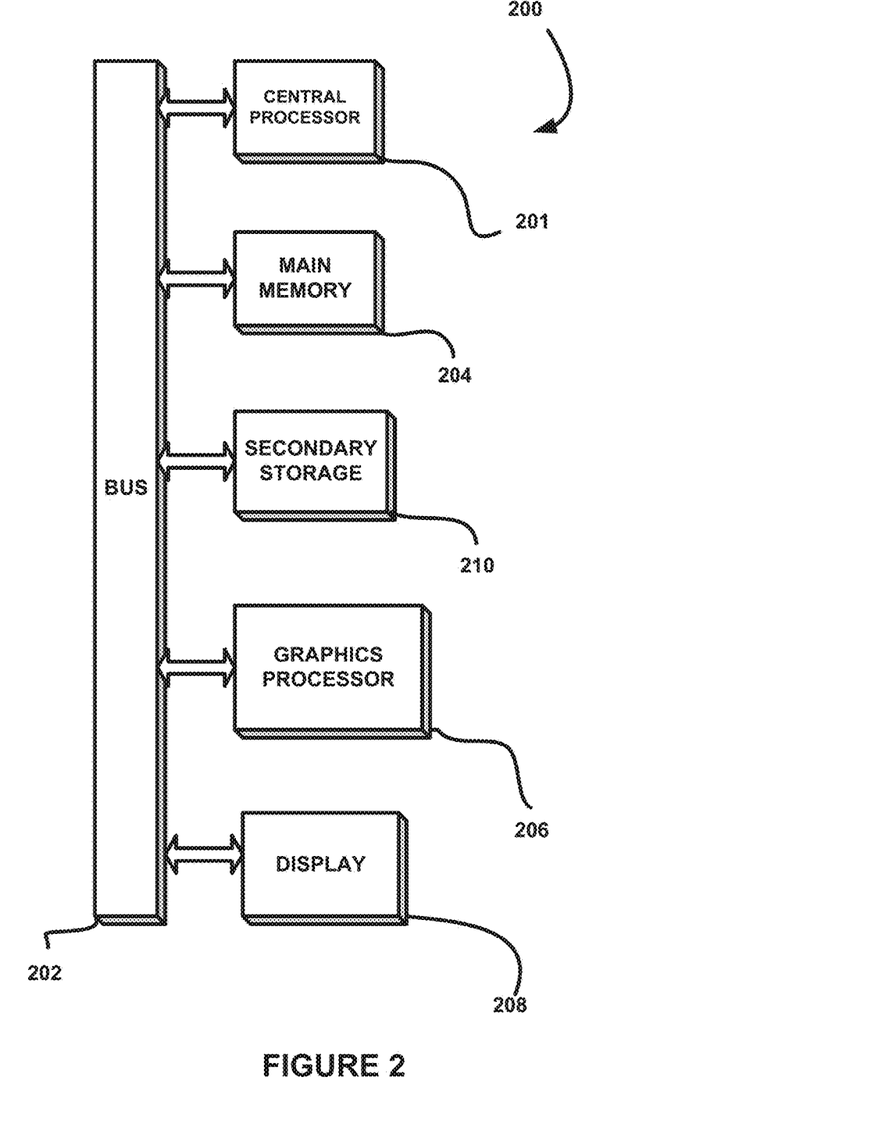
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
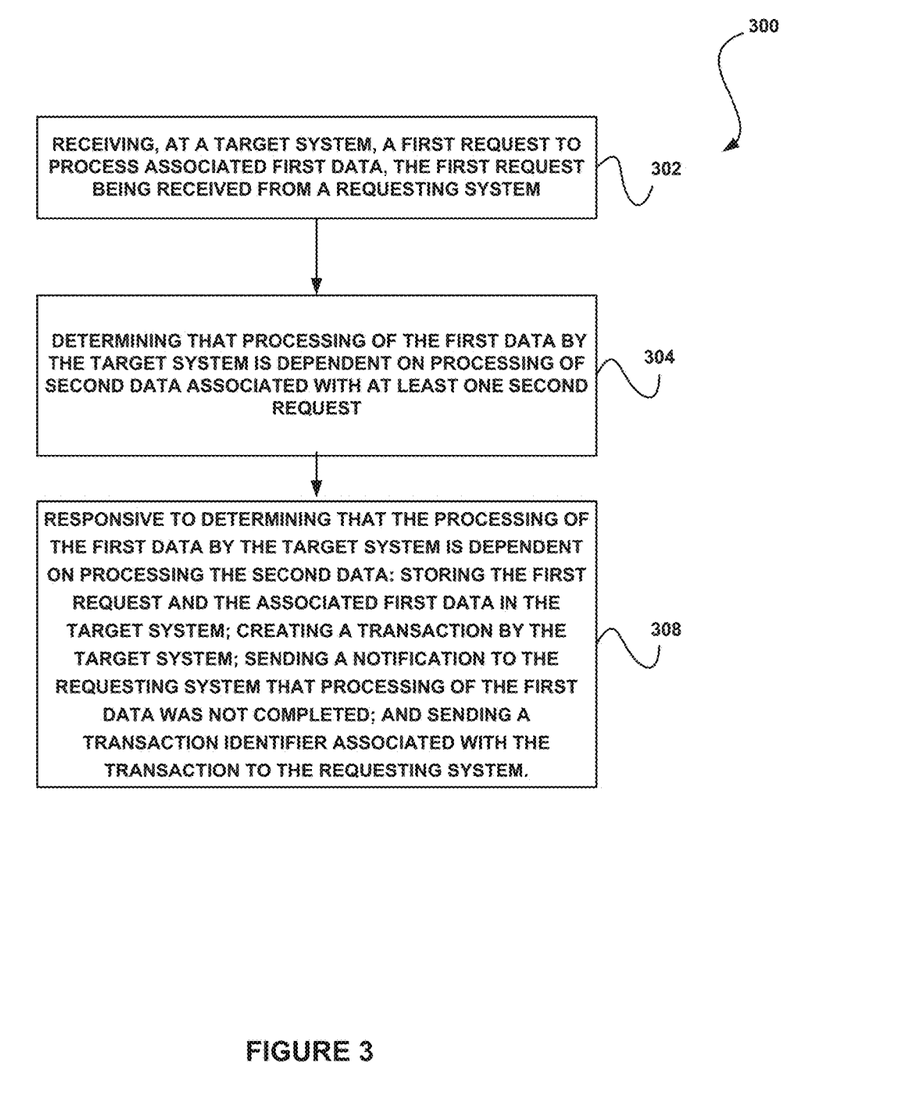
FIG. 3 illustrates a method for processing interdependent transactions between a requesting system and a target system, in accordance with one embodiment.

FIG. 3 illustrates a method 300 for processing interdependent transactions between a requesting system and a target system, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, a first request to process associated first data is received at a target system, the first request being received from a requesting system. See operation 302. The requesting system and the target system may include any type of system.

For example, in one embodiment, the requesting system and the target system may be associated with a telecommunication service provider system. In another embodiment, the requesting system and the target system may be associated with a billing system. Additionally, the requesting system and/or the target system may include any type of hardware and/or software. For example, in one embodiment, the requesting system may include a first software application and the target system may include a second software application.

Further, the first request to process associated first data may include any type of request to process any type of data. For example, in one embodiment, the first request may include a request to create a new data object. In another embodiment, the first request may include a request to edit an existing data object. In another embodiment first request may include a request to delete an existing data object.

Further, it is determined that processing of the first data by the target system is dependent on processing of second data associated with at least one second request. See operation 304. In one embodiment, determining that processing of the first data by the target system is dependent on processing of the second data may include utilizing at least one information model to determine that processing of the first data by the target system is dependent on processing of the second data.

In this case, both the target system and the requesting system may have access to the information model. In one embodiment, it may be determined that the first data has a mandatory bidirectional association with the second data (e.g. based on the information model, etc.). The mandatory bidirectional association may indicate to the target system that the first data may not be processed consistently with the information model until the second data is processed.

Responsive to determining that the processing of the first data by the target system is dependent on processing the second data, the first request and the associated first data are stored in the target system, in a temporary cache. Additionally, a transaction is created by the target system and a notification is sent to the requesting system that processing of the first data was not validated and not registered in permanent memory. Furthermore, a transaction identifier associated with the transaction is sent to the requesting system. See operation 308.

In one embodiment, it may also be determined that executing the first request will cause the generation of inconsistent data. In one embodiment, the method 300 may further include processing the first data and processing the second data to create a first object instance of a first class and a second object instance of a second class, with an association between the first object instance of the first class and the second object instance of the second class.

In one embodiment, the target system may store the first request and the associated first data in a temporary cache, after they have been processed. Further, in one embodiment, the first request may be at least partially executed. For example, at least partially executing the first request may include at least partially processing the first data. In this case, storing the first request and the associated first data in the target system may include storing the at least partially executed first request and the at least partially processed first data in cache memory associated with the target system.

Still yet, in one embodiment, the method 300 may include receiving, at the requesting system, at least the transaction identifier from the target system. In this case, in response to the requesting system receiving the transaction identifier from the target system, the requesting system may request that the target system roll back the first request. In response to receiving a request to roll back the first request at the targeting system, the first request and the associated first data may be removed from the target system.

Further, in one embodiment, in response to the requesting system receiving the transaction identifier from the target system, the at least one second request may be sent to the target system to process the second data. Furthermore, results of executing the first request and the at least one second request may be committed to the target system.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
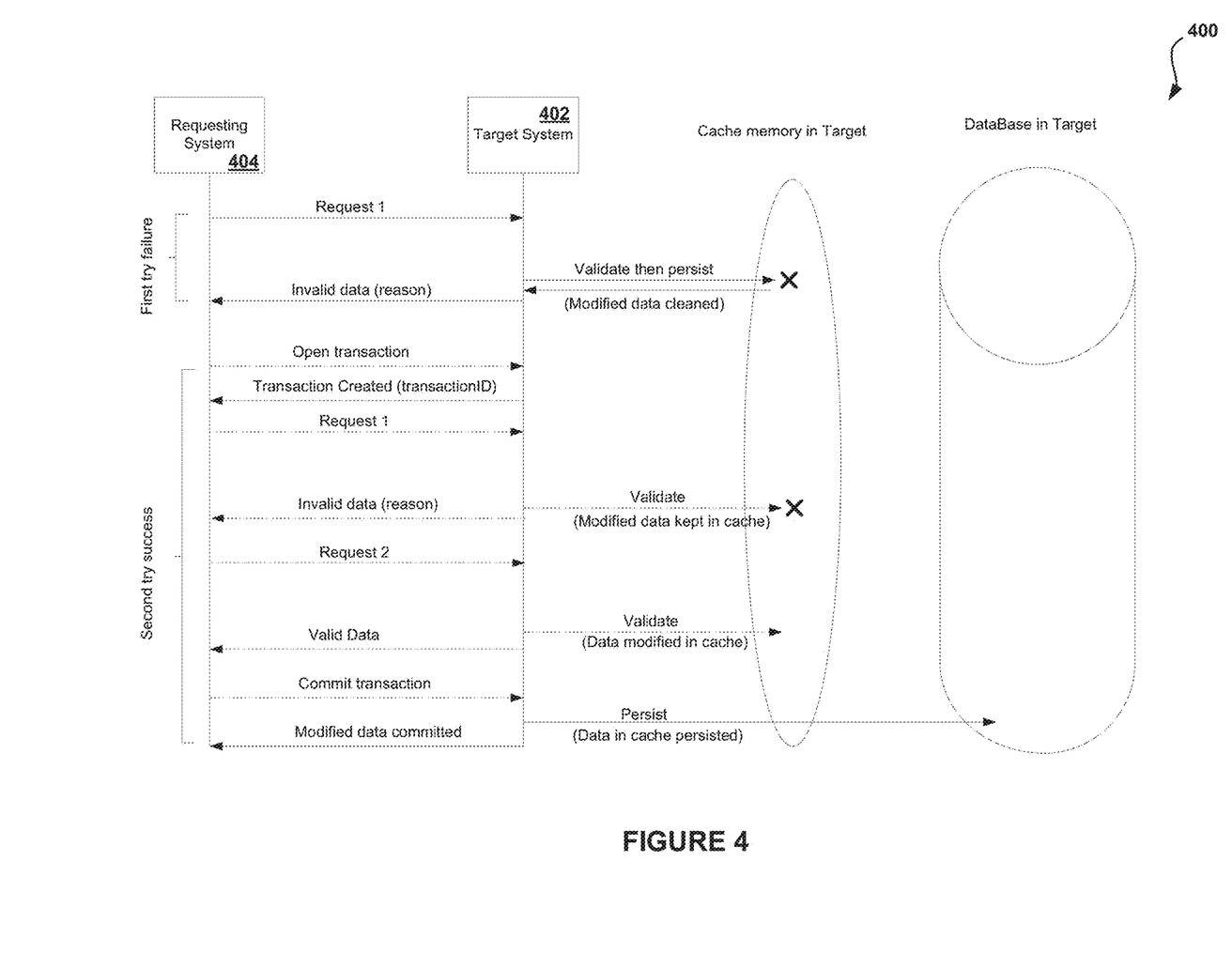
FIG. 4 illustrates a system for processing interdependent transactions between a requesting system and a target system, in accordance with one example.

FIG. 4 illustrates a system 400 for processing interdependent transactions between a requesting system and a target system, in accordance with one example. As an option, the system 400 may be implemented in the context of the details of FIGS. 1-3. Of course, however, the flow system 400 may be implemented in the context of any desired environment. Further, the aforementioned definitions may equally apply to the description below.

FIG. 4 shows that, in a case where data modified by an initial request is not valid, a typical target system 402 does not keep the modified data in memory and sends a failure response to a requesting system 404. In this case, the requesting system 404 needs to open a transaction and resend the initial request as part of a transaction, which may include additional data (e.g. dotted lines show exchanges executed in the context of the transaction, etc.).

A frequent case in request/response exchanges is when a requesting system sends requests that will result, after complete execution, in modifying data in a target system. Typically, this modification causes the creation of new objects, modification of existing objects, or the deletion of existing objects. Before permanently accepting the modifications, the target system may validate conformance of the modified data against an information model, known by both the requesting system and the target system.

As an example, an information model may specify that any object instance of class A must be associated to an object instance of class B, through a mandatory bidirectional association. In this case, the requesting system wants to create an object instance of class A and an object instance of class B with an association between the two. However, it may not be possible to create both objects in a single request, because there may not be an operation included in the interface that supports this capability. If the requesting system sends a request to create object A only, it will be rejected by the target system, since the mandatory association to the object instance B cannot be present without first creating object B.

With reference to FIG. 4 operation, the requesting system 404 may send a request to the target system 404. Based on an information model, the target system 402 may determine that the request and associated data may not be persisted and/or validated. In a typical case, the targeting system 402 will clear the modified data and send an invalid data message to the requesting system 404. The requesting system 404 will then have to open a transaction and notify the target system 402. The target system 402 creates a transaction.

Further, the requesting system 404 resends the request as part of a transaction and the target system 402 processes the request, validates the request, and stores the modified request/data in a cache. The target system 402 further indicates the data is invalid (e.g. because the request was dependent on other data, etc.). The requesting system 404 then sends another request, the other request including the data on which the first request is dependent. This request is processed by the target system 402 and is validated.

The target system 402 sends an indication that the validation was successful and the requesting system 404 sends a message to the targeting system 402 to commit the data associated with the two requests to cache. The target system 402 commits the results to cache. Additionally, the target system 402 sends a message indicating the modified data has been committed to memory.

Thus, in order to handle interdependent data requests, the requesting system 404 creates a transaction and executes subsequent requests inside the context of this transaction, then requests a transaction commit when all data have been modified and a valid state has been reached in the target system 402.

However, creating a transaction and executing requests in a transaction context generates execution overhead that should be avoided when not needed. Thus, except for a case where the requesting system 404 anticipates the need of multiple requests, the requesting system 404 will not use a transaction to execute requests.

With sophisticated information models being more frequently used, the case may be much more complex than in the example above. For example, the requesting system 404 may not even be aware of the indirect consequences of the execution of a given request with respect to data modification in the target system 402.

Therefore, it may often happen that the execution of a single request will result in invalid data in the target system 402. In this case, the target system 402 may roll back the request by removing all modifications resulting from the execution of the request and send a response to the requesting system 404 indicating the failure of the execution, possibly accompanied with the corresponding reason why the modified data is invalid. The requesting system 404 may then create a transaction and attempt to re-execute the initial request in the context of the transaction and will then continue executing additional requests in the context of the same transaction.

Figure 5:
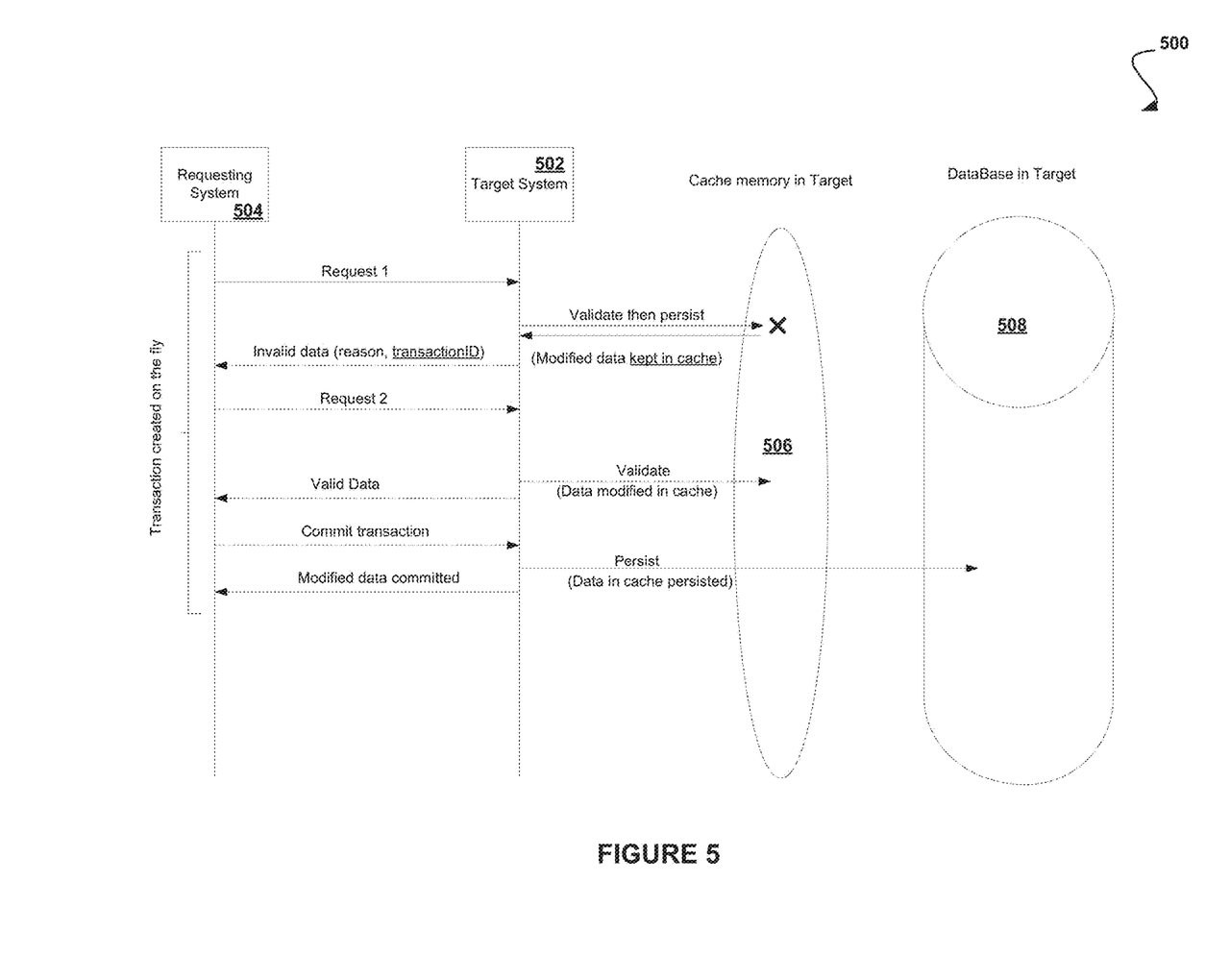
FIG. 5 illustrates a system for processing interdependent transactions between a requesting system and a target system, in accordance with one embodiment.

FIG. 5 illustrates a system 500 for processing interdependent transactions between a requesting system and a target system, in accordance with one embodiment. As an option, the system 500 may be implemented in the context of the details of FIG. 14. Of course, however, the system 500 may be implemented in the context of any desired environment. Further, the aforementioned definitions may equally apply to the description below.

In one embodiment, the system 500 may function to optimize the interaction pattern described in the context of FIG. 4. In this case, there may be no explicit transaction mechanism used for generating transactions. Instead, when a target system 502 realizes that the execution of a given request will generate inconsistent data, the target system 502 may automatically create an internal transaction on behalf of a requesting system 504, and may keep the modified data already received in a temporary memory (e.g. cache) 506. The target system 502 will return a response to the requesting system 504 indicating that the execution has resulted in inconsistent data, in addition to providing a transaction ID.

When receiving this response, the requesting system 504 may either send a rollback request with this transaction ID, which will result in invalidating the execution of the previous request, or accept the transaction has been created by the target system 502, and then continue sending new requests to modify other objects, within this transaction. Then, at a later stage, when receiving confirmation that data modified through the requests of the transaction is valid, the requesting system 504 may send a commit request to permanently register the modifications in the target system 502 (e.g. in a database 508, etc.). In this way, overall execution time may be reduced with respect to standard implementations by avoiding rejecting and then re-executing the initial request.

Figure 6:
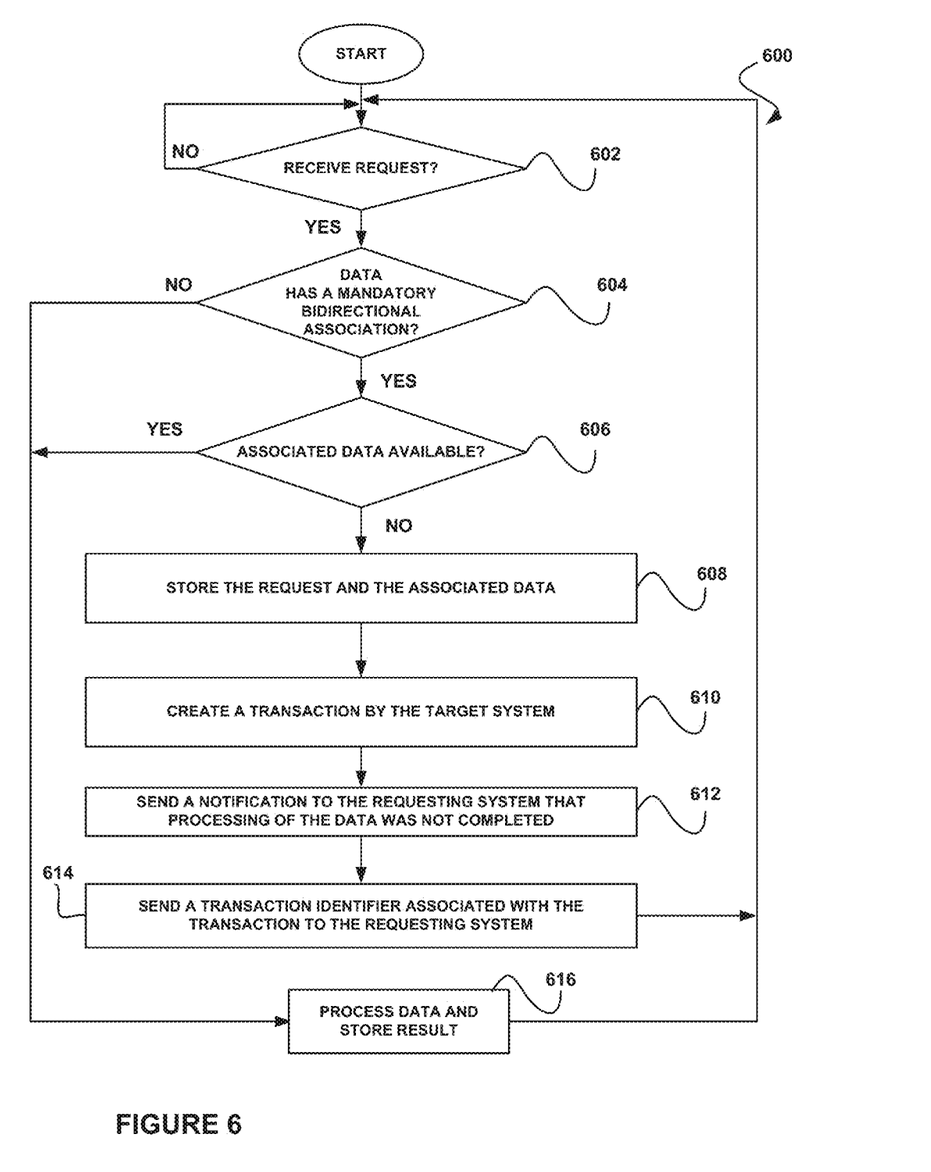
FIG. 6 illustrates a method for processing interdependent transactions between a requesting system and a target system, in accordance with another embodiment.

FIG. 6 illustrates a method 600 for processing interdependent transactions between a requesting system and a target system, in accordance with another embodiment. As an option, the method 600 may be implemented in the context of the details of FIGS. 1-5. Of course, however, the method 600 may be implemented in the context of any desired environment. Further, the aforementioned definitions may equally apply to the description below.

As shown, it is determined whether a request has been received from a requesting system. See decision 602. Further, utilizing an information model, a target system that received the request determines whether the data associated with the request, has a mandatory bidirectional association. See decision 604.

If there is no mandatory bidirectional association, the request is processed and the result is stored. See operation 616. If there is a mandatory bidirectional association, it is determined whether the data required for the mandatory bidirectional association is available at the target system. See decision 606.

If the data is available, the request is processed. If the data is not available, the associated data is stored in the target system. See operation 608. Additionally, a transaction is created by the target system. See operation 610.

Further, a notification is sent to the requesting system indicating that processing of the request/data was not completed. See operation 612. Moreover, a transaction identifier associated with the transaction is sent to the requesting system. See operation 614. In this way, the requesting system may send additional requests in the context of the transaction created by the targeting system.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code for receiving, at a target system, a first request to process associated first data, the first request being received from a requesting system;
   computer code for determining, by the target system using an information model, that processing of the first data is dependent on the target system processing second data that is not available at the target system;

computer code for, responsive to determining that the processing of the first data by the target system is dependent on the target system processing the second data that is not available at the target system:

(a) sending, by the target system to the requesting system, an invalid data message, (b) creating, by the target system, a transaction and providing a transaction identifier associated with the created transaction to the requesting system which prompts the requesting system to resend the first request as a part of the transaction, (c) receiving, by the target system from the requesting system, the resent first request, (d) processing, by the target system within the transaction, the resent first request including processing the first data, (e) storing, by the target system, the processed first data in a cache, (f) indicating, by the target system to the requesting system, that the processed first data is invalid since the processing of the first data by the target system is dependent on the target system processing the second data that is not available at the target system, which prompts the requesting system to send the second data with a second request to process the second data within the transaction, (g) processing, by the target system, the second request within the transaction once received from the requesting system, (h) determining, by the target system using the information model, that a valid state associated with the processing of the first data and the processing of the second data has been reached within the target system, (i) indicating, by the target system to the requesting system, that the valid state has been reached with a request for a transaction commit, which prompts the requesting system to send a message to the target system to commit the processed first data and the processed second data to cache, (j) committing, by the target system, the processed first data and the processed second data to cache.

2. The computer program product of claim 1, wherein the computer program product is operable such that the requesting system and the target system are associated with a telecommunication service provider system.

3. The computer program product of claim 1, wherein the computer program product is operable such that the requesting system includes a first software application and the target system includes a second software application.

4. The computer program product of claim 1, wherein processing the first data creates a first object instance of a first class and processing the second request creates a second object instance of a second class, with an association between the first object instance of the first class and the second object instance of the second class.

5. A method, comprising:

receiving, at a target system, a first request to process associated first data, the first request being received from a requesting system;

determining, by the target system using an information model, that processing of the first data is dependent on the target system processing second data that is not available at the target system;

responsive to determining that the processing of the first data by the target system is dependent on the target system processing the second data that is not available at the target system:

(a) sending, by the target system to the requesting system, an invalid data message, (b) creating, by the target system, a transaction and providing a transaction identifier associated with the created transaction to the requesting system which prompts the requesting system to resend the first request as a part of the transaction, (c) receiving, by the target system from the requesting system, the resent first request, (d) processing, by the target system within the transaction, the resent first request including processing the first data, (e) storing, by the target system, the processed first data in a cache, (f) indicating, by the target system to the requesting system, that the processed first data is invalid since the processing of the first data by the target system is dependent on the target system processing the second data that is not available at the target system, which prompts the requesting system to send the second data with a second request to process the second data within the transaction, (g) processing, by the target system, the second request within the transaction once received from the requesting system, (h) determining, by the target system using the information model, that a valid state associated with the processing of the first data and the processing of the second data has been reached within the target system, (i) indicating, by the target system to the requesting system, that the valid state has been reached with a request for a transaction commit, which prompts the requesting system to send a message to the target system to commit the processed first data and the processed second data to cache, (j) committing, by the target system, the processed first data and the processed second data to cache.

6. A target system comprising:

a memory system; and one or more processing cores coupled to the memory system and that are each configured to:

receive, at the target system, a first request to process associated first data, the first request being received from a requesting system;

determine, by the target system using an information model, that processing of the first data is dependent on the target system processing second data that is not available at the target system;

responsive to determining that the processing of the first data by the target system is dependent on the target system processing the second data that is not available at the target system:

(a) send, by the target system to the requesting system, an invalid data message, (b) send, by the target system, a transaction and providing a transaction identifier associated with the created transaction to the requesting system which prompts the requesting system to resend the first request as a part of the transaction, (c) receive, by the target system from the requesting system, the resent first request, (d) process, by the target system within the transaction, the resent first request including processing the first data,
(e) store, by the target system, the processed first data in a cache,
(f) indicate, by the target system to the requesting system, that the processed first data is invalid since the processing of the first data by the target system is dependent on the target system processing the second data that is not available at the target system, which prompts the requesting system to send the second data with a second request to process the second data within the transaction,
(g) process, by the target system, the second request within the transaction once received from the requesting system,
(h) determine, by the target system using the information model, that a valid state associated with the processing of the first data and the processing of the second data has been reached within the target system,
(i) indicate, by the target system to the requesting system, that the valid state has been reached with a request for a transaction commit, which prompts the requesting system to send a message to the target system to commit the processed first data and the processed second data to cache,
(j) commit, by the target system, the processed first data and the processed second data to cache.

* * * * *